Nov. 29, 1938.   H. F. VICKERS   2,138,050
HYDRAULIC POWER TRANSMISSION AND CONTROL
Filed Feb. 17, 1936   3 Sheets-Sheet 1

INVENTOR.
Harry F. Vickers
BY
Barnes, Kisselle, Laughlin & Raisch
ATTORNEYS

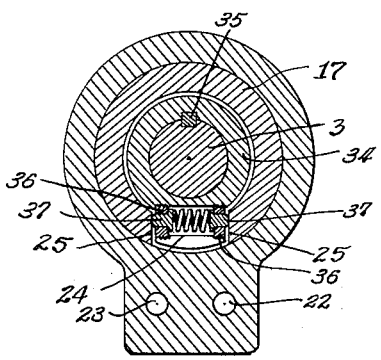
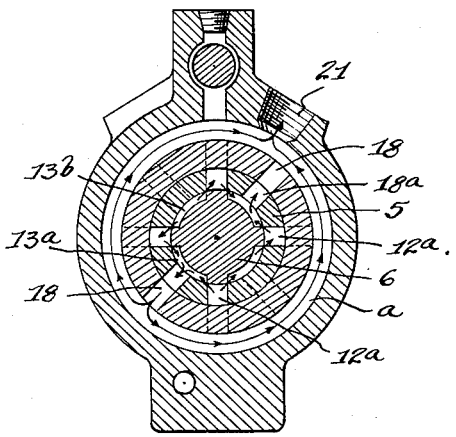
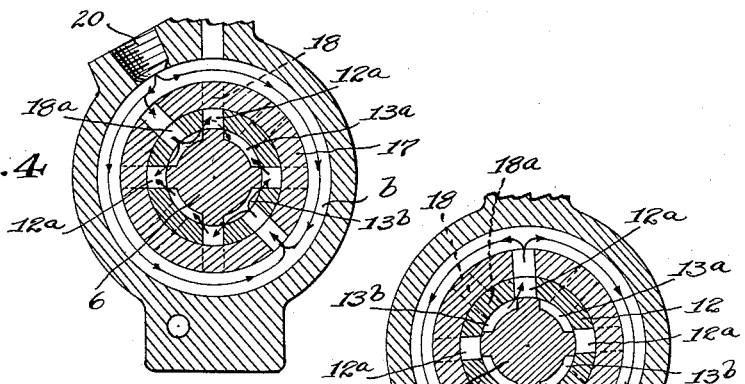

Nov. 29, 1938.  H. F. VICKERS  2,138,050

HYDRAULIC POWER TRANSMISSION AND CONTROL

Filed Feb. 17, 1936  3 Sheets-Sheet 3

INVENTOR.
Harry F. Vickers
BY
Barnes, Kisselle, Laughlin & Raisch
ATTORNEYS

Patented Nov. 29, 1938

2,138,050

UNITED STATES PATENT OFFICE 2,138,050

HYDRAULIC POWER TRANSMISSION AND CONTROL

Harry F. Vickers, Detroit, Mich.

Application February 17, 1936, Serial No. 64,267

11 Claims. (Cl. 121—41)

This invention relates to hydraulic power transmission and control, and has to do particularly with a novel follow valve and motor forming a part of said transmission and control.

This application is a continuation in part of my prior application, resulting in Patent No. 2,030,902, issued February 18, 1936. The main object of the present invention has to do with a balanced, rotary follow-up valve, which, as described in said application, is formed of a cylindrical member which separates the control shaft into two parts, and through which valve all the liquid under pressure flows under balanced control; and through which valve power is transmitted directly and mechanically in case of failure of liquid pressure.

Other features of this invention have to do with varied applications of said balanced, rotary valve to hydraulic power transmitting systems, such as the control and directional movement of large masses, gun mounts, hydraulic hoists and machine tools; in every case, the oil flowing through the valve being controlled with a minimum of effort under any pressure because of the balanced relationship of the valve parts. Still further features contemplate the combination of a balanced rotary follow valve and a balanced motor, together with details of construction and arrangement of the parts going to make up the valve as will be more clearly set forth in the specification and claims.

In the drawings:

Figs. 2 to 6 are sectional views taken on lines 2—2 to 6—6 of Fig. 1 and showing in particular the various positions of the follow-up valve parts.

Figure 1:
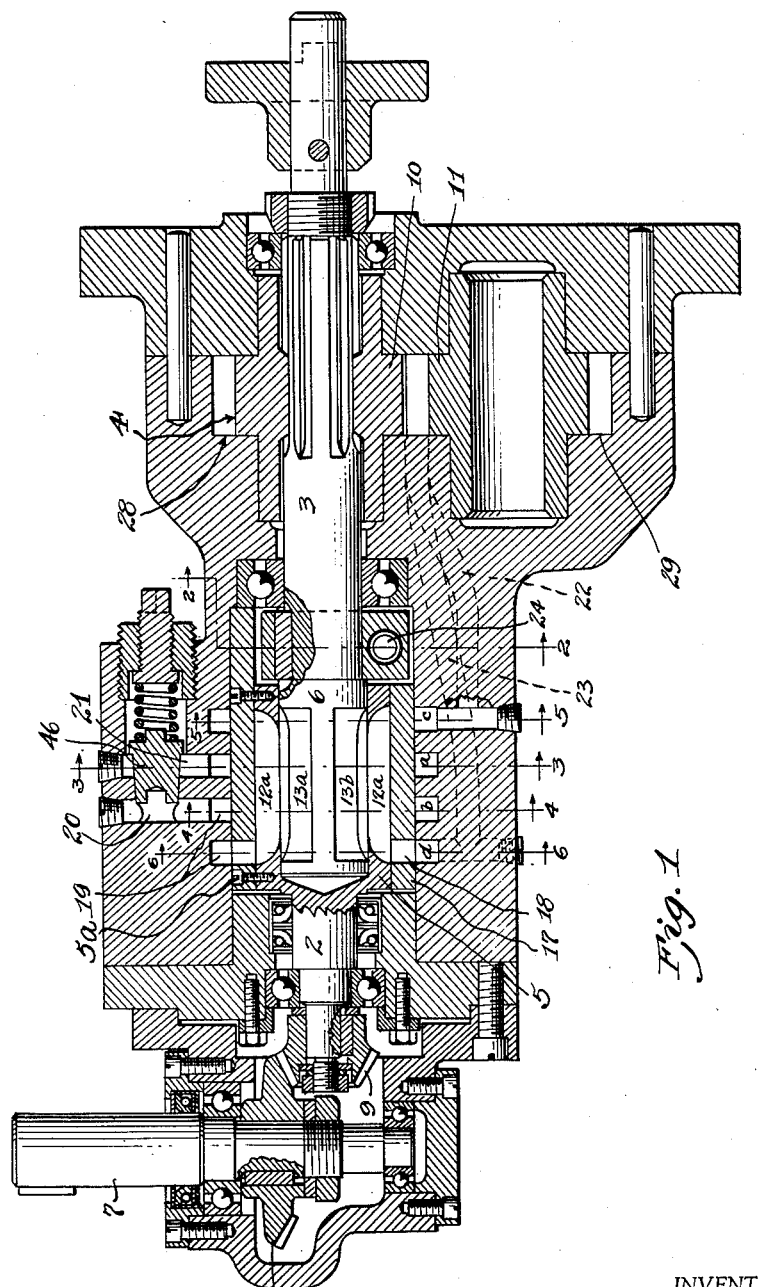
Fig. 1 is a longitudinal sectional view through one type of power transmission unit wherein the balanced rotary follow-up valve and motor are in longitudinal alignment.
Figure 7:
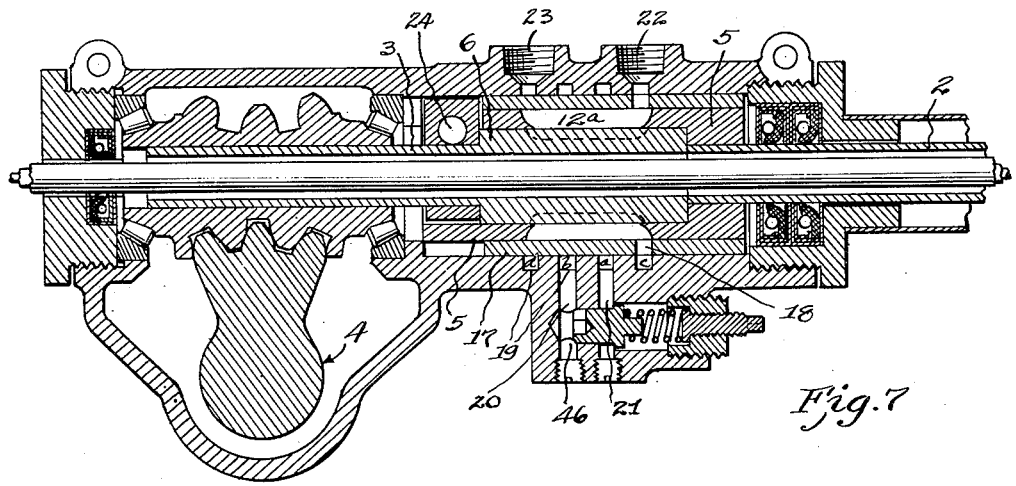
Fig. 7 is a longitudinal sectional view similar to Fig. 1 but illustrating the relative arrangement of the rotary follow-up valve and operating parts and manner of positioning the same as part of a vehicle steering gear housing, with the cross shaft of the motor at right angles to the control shaft and follow-up valve.
Figure 8:
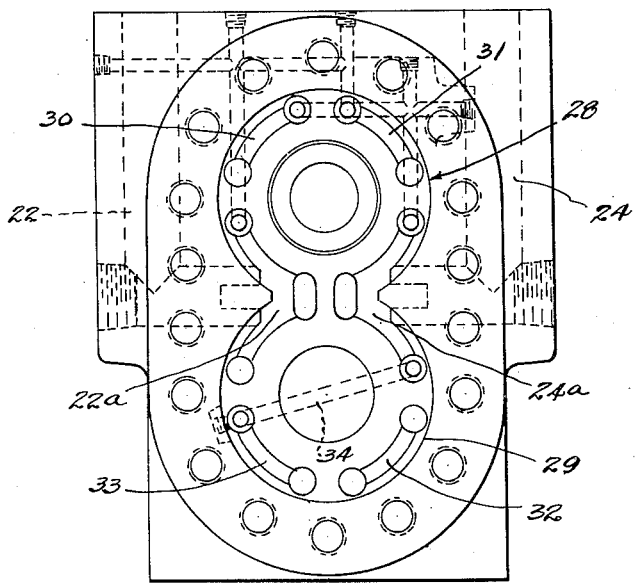
Fig. 8 is an end view of the balanced gear motor casing of the unit shown in Figure 1.

In the embodiment of the invention as illustrated in Figures 1, 7 and 8, the hydraulic transmission units generally include a control or actuating shaft 2, usually manually operated, a power shaft 3 directly connected to a hydraulic motor 4, and a rotary follow-up valve connecting the two shafts; said valve comprising an outer annular slotted sleeve 5 rigidly connected to the shaft 2 and an inner longitudinally grooved cylindrical valve member 6 rigidly connected to the shaft 3.

As the rotary follow-up valve details constitute a main feature of the present invention, I will preferably describe the same in connection with Figure 1; although the construction of the rotary valve of Figure 1 is practically identical with that shown in Figure 7, (which is a copy of Figure 1 of my said patent), Figure 1 is believed to present a better disclosure. Figures 2 to 6 are identical in arrangement and operation to Figures 5 to 9, respectively of said Patent No. 2,030,902.

The shaft 2 may be actuated by a suitable manually operated shaft 7 through bevel gears 8 and 9. The shaft 3 is adapted to be actuated by a gear 10 which meshes with a gear 11, both gears forming a part of the motor 4; in detail the shaft 3 being splined to the gear 10 and directly connected to a driving coupling. The annular sleeve 5 is adapted to rotate relative to or with the inner cylindrical valve member 13.

The sleeve 5 contains four diametrically positioned slots 12a which, as best shown in Figures 2 to 6, are adapted to cooperate with longitudinal valve members or ridges 13a and 13b which are formed as grooves in the surface of the inner valve member 6. In the preferred form the slots 12a are slightly wider than the ridges 13a and 13b so that in normal neutral position the oil is free to flow from one depression in the valve member 6 to the other, as best illustrated in Figs. 3 and 4.

A sleeve 17 has a shrink fit around the sleeve 5 and thus forms a part of and moves with the sleeve 5. Set screws 5a hold the parts in position. This sleeve 17 is provided with a plurality of ports 18 both circumferentially and longitudinally spaced. The inner walls of the follow-up valve housing are provided with spaced annular grooves 19 which are adapted to cooperate or align with the respective ports 18 of the sleeve 17, the longitudinally and circumferentially spaced ports 18 being so arranged as to at all times connect the depressions of the valve part 6 with the proper annular grooves 19 regardless of the position of the shaft 11 and the annular sleeve 12 connected thereto.

Operating fluid for actuating the motor 4 is supplied to the rotary valve through conduit 20 and exhausted from the motor and valve through conduit 21. Inasmuch as the motor shaft 3 is adapted to be directly connected to a driven member of large mass, it will be obvious that accurate, positively controlled movement of the shaft 14 is important at all times. Flow of pressure fluid between the follow-up valve and motor is by means of the conduits 22 and 23 which lead to and from the intake and exhaust chambers of the gear motor in the usual manner.

To insure accurate control of the driven member, I preferably utilize a follow-up retarding device 24 of the type best indicated in Fig. 2. As shown in Fig. 1, one end of the follow-up valve represented by the sleeves 5 and 17 is cut away to receive the retarding device 24, and as shown in Fig. 2, this retarding device comprises an annular portion 34 keyed to the shaft 3 of the follow-up valve as at 35, the annular member 34 carrying apertured flange portions 36 adapted to receive spring pressed lugs 37 for contact with accurately machined surfaces 25 which are accurately predetermined relative to the respective grooves in the follow-up valve so as to insure that the control valve will always assume a positively neutral position on being centered. It will be seen that with these parts of the retarding device and the cut away portion of the sleeve accurately machined the grooves in the one portion of the follow-up device will be positively centered relative to the grooves in the other portion of the follow-up device. Displacement of the follow-up member 5 relative to the follow-up portion 6 will result in practically instantaneous movement of the motor 4 and hence substantially instantaneous movement of the other follow-up part 6. As long as the control shaft 2 is continuously turned in either direction the member 24 and the valve part 6 will follow this movement, but the instant the hand controlled shaft 2 is stopped, then the valve sleeve 17 will be positively retarded and neutralized by the expansion of one of the lugs 37 on the retarding device 24, with the result that the driven member will come to a stop at the exact point predetermined by the stopping of the hand actuated shaft 2 and thus prevent any overrun of the motor 4 and driven member which would otherwise be caused by friction between the follow-up valve parts.

Operation of the follow-up device may be best illustrated by referring to Figs. 2 to 6 which represent sections taken on lines 2—2 to 6—6 of Fig. 1. The circular grooves 19 upon which the sections are taken are numbered a, b, c, and d, respectively. The sleeve 5 is provided with four slots or grooves 12a and four diametrically positioned apertures 18a equidistantly positioned between the slots. The outer sleeve 17 has eight apertures 18 which are in alignment with the slots 12a and apertures 18a of the sleeve 5, such apertures 18 and 18a being arranged so that they correspond with the proper grooves a, b, c and d in the housing. The raised portions between the depressions 13a and 13b and the valve 6 are preferably of a width slightly less than the width of the grooves 12a so that with the valve sleeve 5 in central position, fluid will pass through the ports 18 of the sleeve 17, which are in alignment with said ports 18a, and as the raised portions of the valve 6 are of less width than the grooves 12a, the fluid will pass from the diametrically opposide depressions 13b into adjacent diametrically opposite depressions 13a. Fluid flowing past the raised portions of the valve 6 and entering diametrically opposed depressions 13a will pass out through the registering ports 18a and 18 and then by way of annular groove a, enter the outlet conduit 21. Thus, while oil will be continuously supplied equally to both opposed working chambers of the motor, the continuous circulation of fluid, as shown in Figs. 3 and 4, permits the use of a continuously operating pump, and all the parts being diametrically arranged, as shown, will result in a completely balanced follow-up valve structure. Both parts of the follow-up valve are balanced at all times, any incoming or outgoing pressure on one side is equally counterbalanced on the other side, whether internal or external.

Actuation of the shaft 2 will result in movement of the sleeve 5 relative to the central follow-up valve member 6 so that, referring to Fig. 5, the outlet from the depressions 13b is confined to a single slotted portion 12a with the result that fluid flowing into the depressions 13b from the inlet port 20 will be conducted through the conduit 22 to the motor 15, while fluid from the exhaust chamber of the motor will be pumped back through the conduit 23, annular groove d and into the depressions 13a and back to the pump though the conduit 21. Actuation of the motor 4 will, of course, actuate the shaft 3 to control the movement of the driven member whatever it may be. This movement will be transmitted back through the shaft 3 so that the inner valve member 6 will follow up the outer valve member 5, until the hand actuated shaft 2 stops, when the valve ports will be positively neutralized by means of the retarding mechanism shown in Fig. 2; it being understood that the spring of the retarding device 24 is of just sufficient strength to overcome the friction between the follow-up valve parts. Thus all over travel is eliminated without in any way affecting the continuous hydraulic control through the follow-up valve.

In Figure 8 I have shown an end view of the motor portion 4 of Figure 1 with the end plate removed, the passageways 22 and 24 being shown vertically instead of horizontally as in Figure 1. The construction of the balanced gear and casing is the same as that disclosed in my Patent #1,937,367. One passageway 22 connects with the pressure chamber 22a and the other passageway 24 connects with the pressure chamber 24a. An upper gear chamber 28 is adapted to receive the gear 10 and a lower gear chamber 29 receives the gear 11. The auxiliary pressure chambers 30 and 31, in the upper gear chamber, are positioned diametrically opposite the pressure chambers 24a and 22a, respectively; in the lower chamber 29 an auxiliary pressure chamber 32 is positioned diametrically opposite to the pressure chamber 22a and an auxiliary pressure chamber 33 is positioned opposite the pressure chamber 24a. The conduit designated by the dotted line 34 illustrates one manner of connecting opposed pressure chambers. By this arrangement it will be seen that the gears will float within the gear chambers regardless of the degree of pressure on one portion of the gear, the diametrically opposite portion of the gear will be balanced with exactly the same pressure, and over the same area. Figure 7 is a sectional view of my rotary follow-up valve as applied to a steering gear housing, and is identical with Figure 1 of my said Patent No. 2,030,902. As the parts and arrangement thereof of the follow-up valve and housing in Figure 7, are identical with the parts and arrangement of the follow-up valve in Figure 1, the same numerals have been used in designating the same, the only difference between Figures 1 and 7 being that in Figure 1 the motor 4 is in longitudinal alignment with the axes of the follow-up valve while in Figure 7 the shaft 4 which is adapted to also carry the motor, is at right angles to the axes of the follow-up valve. It will thus be seen that whether operating a steering gear for a vehicle or in a transmission unit as shown in Figure 1, embodying a balanced gear motor, the action and operation of the follow-up valve is substantially the same. In either case regardless of the pressures used the parts connected to the follow-up valve will be free to rotate because all parts are under equal balance.

What I claim is:

1. A valve including a housing, a pair of nested cylindrical elements capable of limited relative rotation, the outer element having longitudinal slots in its inner surface, the inner element having longitudinal grooves in its outer surface, one of said elements also having ports through its wall communicating with certain of said grooves, said ports and grooves forming a plurality of conduits from the exterior of the outer element to the exterior of the inner element, the cross sections of said conduits being variable by alteration of the angular relation between said elements, and a plurality of annular conduits in said housing and positioned intermediate the ends of said slots and grooves and registering with said ports.

2. A valve including a pair of elongated nested cylindrical elements capable of limited relative rotation, the inner of said elements having a series of alternate longitudinal grooves and lands in the outer surface thereof, the outer of said elements having a series of slots in the inner surface thereof and arranged to register approximately with the lands and grooves of the inner element whereby relative rotative movement of said elements opens, varies or cuts off communication between certain of the slots of one element and adjacent grooves of the other element, one of said elements having ports through the wall thereof communicating with certain of said grooves, the ports and grooves forming a plurality of conduits variable by change in angular relation between said elements, and a plurality of annular conduits in said housing and positioned intermediate the ends of said slots and grooves and registering with said ports.

3. In follow-up mechanism for a power steering gear, a valve comprising two telescoped members relatively movable a limited amount from an intermediate neutral position, said valve having a fluid inlet, an outlet, and ducts leading to opposed equal pressure chambers, said valve also having passages from the inlet to the outlet, and passages connecting said ducts, both passages being open when the members are in neutral relative position, said passages including cooperating longitudinal grooves in the adjacent surfaces of said members and being arranged so that relative rotative movement of said members from their neutral position simultaneously closes some of said passages, connects said inlet directly to one of said ducts, and connects said outlet directly to the other of said ducts.

4. A valve comprising a pair of nested cylinders, one fitted within the other and rotatable thereon through a limited angle in either direction from a normal relative position, a cylindrical member rigidly attached to and coaxial with one of said cylinders, said member having a notch in its periphery, a second member at an end of the other said cylinder extending into said notch, and a spring-pressed element mounted in one of said members and engaging said other member laterally to oppose relative rotation between said cylinders.

5. A valve comprising a pair of nested cylinders, one fitted within the other and rotatable thereon through a limited angle in either direction from a normal relative position, a cylindrical member rigidly attached to and coaxial with one of said cylinders, said member having a notch in its periphery, a projection at an end of the other said cylinder extending into said notch, and a pair of spring-pressed elements mounted in said member and engaging said projection laterally to oppose relative rotation between said cylinders.

6. A combined hydraulic and manually operated power transmitting unit of the follow-up type, comprising a housing containing a control shaft and a power shaft, a two-part hydraulic control valve mounted in telescoped relation and connected to said control shaft and power shaft, cooperating ports and grooves formed in said two parts of the control valve, a motor connected to said power shaft, said ports and grooves being so arranged that relative movement between the two parts of said control valve directs liquid under pressure to said motor for actuating said power shaft, each of said ports and grooves being diametrically balanced with and under the same pressure as a similar diametrically positioned port and groove to insure balance of said two parts and free relative movement under any pressure.

7. A combined hydraulic and manually operated power transmitting unit of the follow-up type, comprising a housing containing a control shaft and a power shaft, a two-part hydraulically balanced control valve mounted in telescoped relation and connected to said control shaft and power shaft, cooperating ports and grooves formed in said two parts of the control valve, a motor connected to said power shaft, said ports and grooves being so arranged that relative movement getween the two parts of said control valve directs liquid under pressure to said motor for actuating said power shaft, each of said ports and grooves being diametrically balanced with a similar port and groove to insure balance of said two parts and free relative movement under any pressure, and resilient means carried by one of said valve parts and acting upon the other of said valve parts for automatically retarding one of said parts and permitting the other to catch up and assume a relatively neutral position when movement of the control shaft has ceased.

8. A follow-up mechanism for hydraulic power transmitting units comprising a housing, a valve comprising inner and outer hydraulically balanced cylindrical telescoped shaped parts, inlet and outlet ports in said housing connected to a pump and tank, annular grooves formed in said housing and extending around said valve parts and connected to said ports, inlet and outlet ports formed in said housing and connected to a hydraulic motor, annular grooves formed in said housing and extending around said valve parts and connected to said inlet and outlet ports for the motor, and grooves and passages formed in said valve parts for conducting liquid through said valve parts from the pump to the motor at all times, the valve parts in neutral position directing liquid equally to both ends of the motor, and in relative annular position to one or the other end of the motor, and resilient means carried by one of said valve parts and acting upon the other of said valve parts for automatically retarding one of said parts and permitting the other to catch up and assume a relatively neutral position when movement of the control shaft has ceased.

9. A follow-up mechanism for hydraulic power transmitting units comprising a housing, a valve comprising inner and outer cylindrical telescoped shaped parts, inlet and outlet ports in said housing and connected to a hydraulic motor, annular grooves formed in said housing and extending around said valve parts and connected to said ports, inlet and outlet ports formed in said housing and connected to a hydraulic motor, annular grooves formed in said housing and extending around said valve parts and connected to said inlet and outlet ports for the motor, and grooves diametrically positioned and passages formed in said valve parts and so arranged as to continuously maintain said parts in hydraulic balance, some of said grooves extending longitudinally the length of said annular groove, for conducting liquid through said valve parts from the pump to the motor at all times, the valve parts in neutral position directing liquid equally to both ends of the motor, and in relative annular position to one or the other end of the motor and a relief valve forming part of said housing to insure the return of fluid to said pump in case the flow through the valve parts is stopped.

10. In a combined hydraulic and manually operated power transmitting unit of the follow-up type, a follow-up valve, comprising a housing carrying relatively movable nested rotatable members, said members having cooperating longitudinal grooves in their adjacent surfaces, and diametrically opposed cooperating ports and passageways so formed in said members that liquid under pressure flows around, through and over said members in one cross-sectional plane, whether in relative neutral or relative angular position, said ports and passageways being arranged whereby relative angular movement of said members will result in closing some passageways and increasing the effective area of others, all passageways and ports being diametrically balanced in area at any relative position of said members.

11. A combined hydraulic and manually operated power transmitting unit of the follow-up type, comprising a housing containing a control shaft and a power shaft, a two-part hydraulic control valve mounted in telescoped relation and connected to said control shaft and power shaft, cooperating ports and grooves formed in said two parts of the control valve, a motor connected to said power shaft including means for maintaining rotating diametrically opposite parts of said motor under equal balancing pressure, said ports and grooves being so arranged that relative movement between the two parts of said control valve directs liquid under pressure to said motor for actuating said power shaft, each of said ports and grooves being diametrically balanced with and under the same pressure as a similar diametrically positioned port and groove to insure balance of said two parts and free relative movement under any pressure.

HARRY F. VICKERS.